United States Patent Office 2,801,234
Patented July 30, 1957

2,801,234

METHOD OF REMOVING OLEFIN POLYMER FROM PROCESS EQUIPMENT

George E. Hanson, Bartlesville, Okla., assignor to Phillips Petroleum Company, a corporation of Delaware No Drawing. Application March 11, 1955,
Serial No. 493,830

14 Claims. (Cl. 260—94.7)

This invention relates to the dissolution of polymer deposits. In one aspect it relates to a method for removing deposits formed by polymers of unsaturated aliphatic hydrocarbons, such as polymers of ethylene and butadiene, formed in process equipment during polymerization. In another aspect, it relates to a method of removing polymer deposits from metallic surfaces by contacting said polymer with a branched chain paraffin hydrocarbon solvent at elevated temperatures and withdrawing from contact the resulting solution. In a still further aspect, it relates to a method for recovering said polymer.

In the polymerization of an olefin to a polymer, a polymeric material is produced which tends to deposit on surfaces of the processing equipment to which it comes into contact. Such polymeric depositions are usually characterized as being very tough and extremely difficult to remove by conventional methods. Heretofore this polymeric deposition has been removed by scraping the coated surfaces, burning in the case of removable parts, such as tube bundles and filters, and by sand blasting those surfaces which are not removable. These drastic methods of cleaning the polymeric deposition from the equipment surfaces obviously are expensive due to the abnormally rapid wear and high replacement costs of equipment so treated. In addition, these conventional methods are time-consuming and a substantial amount of deposits adhere to the surfaces even after such treatment, and therefore these methods are not resorted to until the efficiency of the process has been reduced to the absolute minimum because of these polymeric deposits.

These polymeric deposits are all characterized by a very low degree of solubility in readily available solvents even though their physical properties vary to some extent, depending upon the particular olefin polymerized and the conditions under which polymerization is carried out. Attempts to remove these deposits by conventional solvents such as naphthenes (e. g. cyclohexane) and aromatics (e. g. xylene), have proved unsatisfactory even when employed at or near their boiling points. Though some of these solvents loosen the deposits from the surfaces to which they adhere, mechanical removal is usually necessary, and thus these solvents are unsatisfactory when deposits occur in inaccessible regions of the process equipment such as tube bundles and filters. Attempts to remove these deposits by contacting or washing them with "warm feed," have also been unsatisfactory.

As a result of polymeric deposition on the surfaces of the processing equipment and the inefficient conventional methods of removing such deposition, the overall efficient operation of the polymerization process itself is hampered. Optimum operating conditions are difficult to maintain due to the deposition of the polymeric material. The heat transfer regions of the processing equipment may become coated with the polymeric deposits and the transfer of heat to the cooling means is interfered with. This is particularly disadvantageous because it is important that the temperature of the polymerization process be rigorously controlled.

Moreover, if the polymeric deposits build up to an appreciable degree, it is important to recover such deposits for economic considerations as a product of practical value, and a satisfactory method of recovery is therefore desirable.

Accordingly, it is an object of this invention to provide an improved method for removing polymers formed in process equipment during the polymerization of olefins.

Another object of this invention is to provide an improved method of recovering from the surfaces of process equipment valuable polymeric deposits.

Other objects, advantages, and features will become apparent from the following disclosure, discussion and the appended claims.

I have found that the polymers of unsaturated aliphatic hydrocarbons deposited on surfaces of process equipment can be readily and effectively removed by contacting the polymer deposits with a high boiling branched chain paraffin hydrocarbon solvent at atmospheric pressure and at elevated temperatures. I have also found that the deposited polymer thus removed may be readily recovered to yield a product of practical value.

This invention is applicable to the removal and recovery of polymeric deposits from any type of equipment employed in the processing of polymers. It is particularly applicable to those types of the processing equipment which have interior regions generally inaccessible by ordinary mechanical methods of removal.

The solvents used in the practice of this invention are mixtures of branched chain paraffin hydrocarbons having boiling ranges of 350° to 600° F. and 9 or more carbon atoms per molecule. The desired process for the production of these solvents is by a special distillation of high boiling heavy alkylates such as disclosed by Legatski U. S. 2,442,011. The preferred and generally feasible fraction to be used in the practice of the present invention is that fraction having a boiling range of 425° to 500° F. The solvents useful in the practice of this invention are commercially available, are relatively stable compounds, and need not be highly pure.

I have found that the polymeric deposits are unexpectedly dissolved and removed readily and effectively by contacting the equipment with a hot branched chain hydrocarbon solvent at atmospheric pressure. This is the preferred method although the use of pressures other than atmospheric is within the scope of this invention. It is also to be understood that the contacting step may be accomplished by simple washing, flushing, immersion in a solvent bath, refluxing, recycling, etc., and the preferred method employed in the practice of this invention will readily be apparent to one skilled in the art.

The contacting or treating temperature employed in the practice of this invention is generally above the initial melting point of the particular polymer. Preferably, the solvent is employed at or near its initial boiling point. Branched chain paraffin hydrocarbon solvents having low initial boiling points are inefficient in the practice of this invention due to their limited solvent action on the polymer deposits. The polymers referred to in this invention all have initial melting points below the initial boiling points of solvent employed. The upper temperature limit may of course be higher if the treating step is carried out under sufficient pressure to maintain the solvent in the liquid phase. In some instances the upper temperature may be limited by the decomposition temperature of the particular polymer. Usually the treating temperature may range between 300° F. and the initial boiling point of the particular solvent employed. Below 300° F., the polymer deposits do not appreciably dissolve in the solvent. The preferred treating conditions are atmospheric pressure and a temperature in the range of 300 to 400° F.

If there is present in the equipment any substantial amount of water, it is preferred to dry the equipment prior to the application of the solvent.

According to this invention the solvent is generally preheated prior to its application to the polymer to be dissolved and removed. However, the solvent may be applied to the surface, from which the polymer is to be removed, for an extended period of time, or after application the surface itself may be heated. Indeed, the solvent can be applied to the surface after the surface and the polymer thereon have been preheated. However, it is preferred to preheat the solvent prior to application. If feasible, the solution should be maintained at a sufficiently high temperature to maintain the polymer in solution. In the practice of this invention, it is not necessary to subject the solvent to extreme agitation, as heretofore had been necessary when conventional solvents were used (usually with the result that the deposits were merely loosened instead of dissolved). However, an occasional agitation or swishing, particularly if an immersion bath is used, may be performed to hasten the removal of deposits from the surfaces of equipment so treated.

The time required for the polymer to go into solution depends upon various considerations and may vary from a few minutes to several hours. Generally for maximum solubility of the polymeric deposits, the polymer deposits are contacted with the solvent for a period of time sufficient to dissolve said deposits and short of the time when the solution becomes saturated, although the preferred contact time is at least one hour for most types of equipment. It has been found that the period of time necessary for an efficient and thorough treating has been reduced to a fraction of the time generally required heretofore. As to the period of treating time, however, it is not intended to make any fixed rule in this respect, since the period of time employed will be dependent upon the particular polymer, the degree of deposition, the method of treatment (e. g., immersion in solvent bath, flushing, refluxing, etc.), the type of equipment being treated, etc. One skilled in the art upon being informed that applicant's solvents are useful in the dissolution of polymeric deposits can readily determine the time required for said dissolution at a desired temperature and the amount of solvent necessary to effect such dissolution.

Although the practice of this invention is believed applicable to a large number of polymers of unsaturated aliphatic hydrocarbons in general, I have found that it is particularly applicable to polymers of ethylene and also to hydrogenated polybutadiene. In one particular instance, a micro-metallic stainless steel bayonet filter plugged with both polyethylene and hydrogenated polybutadiene was cleaned in less than one hour when treated with a branched chain paraffin hydrocarbon solvent (B. P. 431–495° F.) at 340° F. and at atmospheric pressure. Catalyst particles were also removed from this filter along with the polymeric deposits, whereas heretofore when removal by burning was required such catalyst particles remained imbedded in the filter after the polymeric deposits were burned off.

Attempts to remove these polymeric deposits by conventional solvents, such as xylenes and methylcyclohexane, were found to be ineffective even when these solvents were used at their boiling point. In one instance of polymerization procedure, the coils in the feed tank of the batch filter equipment became coated with polyethylene. Continual flushing of the coated equipment with cyclohexane at about 315° F. and 50 p. s. i. g. merely loosened the deposits from the coils and this entailed the supplemental use of mechanical means (i. e., scraping and agitation) to effect removal. This proved to be an ineffectual method of removing the deposits because there was no appreciable solution of the deposits and also because certain coated regions of the equipment (e. g., tube bundles and filters) were inaccessible to mechanical removal means.

Other conventional solvents (e. g., normal heptane) were found inferior not only because of their low solvent action but also because their application would entail the use of pressure equipment to effect even their low solvent action. In the practice of this invention, however, dissolution of the deposits was attained at atmospheric pressure.

Not only is the practice of my invention quicker, cleaner surfaces are obtained and the replacing of certain types of equipment, heretofore damaged by the drastic removal methods of burning and sand blasting, is minimized. With the practice of my invention the large scale operation of the polymerization process is not unduly hampered by polymeric deposition upon the surfaces of the process equipment.

Another particular advantage and object of this invention is the recovery of the polymeric deposits after their removal from the surfaces of the equipment. Thus, a product is obtained of practical value and loss of this product which heretofore contributed to the cost of operation is obviated. After the step of withdrawing the polymer-containing solution from the treated equipment, the polymeric material may be recovered from the solution by first passing the solution through a filter where solid particles such as catalyst and pipe scale are removed, and then passing the clarified solution to a solvent evaporator or, if desired, the solution may be cooled to precipitate the polymer, or any other conventional means may be employed to recover the polymeric material from the solution. After recovery of the polymer, the polymer-free solvent may be reused by recycling, etc. This ability to recover the polymer and solvent greatly enhances the value of such a solvent and adds to the utilitarian nature of the applicant's invention.

Reasonable variation and modification are possible within the scope of the foregoing disclosure and discussion and will become apparent to those skilled in the art and may be practiced without departing from the scope or spirit of the teachings of the disclosure.

Having described my invention, I claim:

1. A method for removing a polymer of a straight chain olefinic hydrocarbon from process equipment, which comprises contacting said polymer with a solvent consisting essentially of branched chain paraffin hydrocarbons boiling in the range of 350° to 600° F. at elevated temperatures for a period of time sufficient to remove said polymer.

2. The method according to claim 1 further comprising withdrawing the resulting solution comprising said solvent and said polymer from said equipment, and recovering said polymer from said solution.

3. The method according to claim 1 in which said polymer is polyethylene.

4. The method according to claim 1 in which said polymer is polybutadiene.

5. The method according to claim 1 in which said polymer is hydrogenated polybutadiene.

6. A method for removing a polymer of a straight-chain olefinic hydrocarbon from process equipment, which comprises contacting at atmospheric pressure said polymer with a solvent consisting essentially of a mixture of branched chain paraffin hydrocarbons boiling in the range of 350° to 600° F. at a treating temperature between the initial melting point of said polymer and the initial boiling point of said solvent for a period of time sufficient to dissolve said polymer, and withdrawing resulting solution comprising said solvent and said polymer from said equipment.

7. A method for removing a polymer of a straight-chain olefinic hydrocarbon from metallic surfaces, which comprises contacting at atmospheric pressure said polymer with a solvent consisting essentially of a mixture of branched chain paraffin hydrocarbons boiling in the range of 350° to 600° F. at a treating temperature between the initial melting point of said polymer and the initial boiling point of said solvent for a period of at least one hour, and withdrawing resulting solution comprising said solvent and said polymer from said surfaces.

8. A method for removing a polymer of a straight-chain olefinic hydrocarbon from metallic surfaces which comprises contacting at atmospheric pressure said polymer with a solvent consisting essentially of a mixture of branched chain paraffin hydrocarbons boiling in the range of 350° to 600° F. at a treating temperature between the initial melting point of said polymer and the initial boiling point of said solvent for a period of time sufficient to dissolve said polymer, and withdrawing resulting solution comprising said solvent and said polymer from said surfaces.

9. A method for removing a polymer of a straight-chain olefinic hydrocarbon which comprises contacting said polymer with a solvent consisting essentially of a mixture of branched chain paraffin hydrocarbons boiling in the range of 350° to 600° F. at a pressure sufficient to maintain the solvent in the liquid phase and at a treating temperature between the initial melting point of said polymer and the initial boiling point of said solvent for a period of time sufficient to dissolve said polymer, and withdrawing resulting solution comprising said solvent and said polymer from said surfaces.

10. A method for removing a polymer of a straight-chain olefinic hydrocarbon from metallic surfaces which comprises contacting at atmospheric pressure said polymer with a solvent consisting essentially of a mixture of branched chain paraffin hydrocarbons boiling in the range of 425° to 500° F. at a treating temperature between the initial melting point of said polymer and the initial boiling point of said solvent for a period of time sufficient to dissolve said polymer, and withdrawing resulting solution comprising said solvent and said polymer from said surfaces.

11. A method for removing a polymer of a straight-chain olefinic hydrocarbon from metallic surfaces, which comprises contacting said polymer with a solvent consisting essentially of branched chain paraffin hydrocarbons boiling in the range of 350° to 600° F. at a treating temperature above the initial melting point of said polymer for a period of time sufficient to remove said polymer from said surfaces, and withdrawing resulting solution comprising said solvent and said polymer from said surfaces.

12. A method for removing a polymer of a straight-chain olefinic hydrocarbon from metallic surfaces, which comprises contacting at atmospheric pressure said polymer with a solvent consisting essentially of a mixture of branched chain paraffin hydrocarbons boiling in the range of 350° to 600° F. at a treating temperature between the initial melting point of said polymer and the initial boiling point of said solvent for a period of time sufficient to dissolve said polymer, and withdrawing resulting solution comprising said solvent and said polymer from said surfaces.

13. A method for removing a polymer of a straight-chain olefinic hydrocarbon from metallic surfaces, which comprises contacting at atmospheric pressure said polymer with a solvent consisting essentially of a mixture of branched chain paraffin hydrocarbons boiling in the range of 350° to 600° F. and at a treating temperature in the range of from 300° F. to a temperature below the initial boiling point of said solvent for a period of time sufficient to dissolve said polymer, and withdrawing resulting solution comprising said solvent and said polymer from said surfaces.

14. A method for removing a polymer of a straight-chain olefinic hydrocarbon from metallic surfaces, which comprises contacting at atmospheric pressure said polymer with a solvent consisting essentially of a mixture of branched chain paraffin hydrocarbons boiling in the range of 425° to 500° F. and at a treating temperature in the range of 350° to 400° F. for a period of time sufficient to dissolve said polymer, and withdrawing resulting solution comprising said solvent and said polymer from said surfaces.

References Cited in the file of this patent
UNITED STATES PATENTS

| | | |
|---|---|---|
| 2,455,665 | Ford et al. | Dec. 7, 1948 |
| 2,580,019 | Gould et al. | Dec. 25, 1951 |

OTHER REFERENCES

Science of Petroleums, vol. V, part 1, 1950.

UNITED STATES PATENT OFFICE

CERTIFICATE OF CORRECTION

Patent No. 2,801,234 July 30, 1957

George E. Hanson

It is hereby certified that error appears in the printed specification of the above numbered patent requiring correction and that the said Letters Patent should read as corrected below.

Column 5, line 21, after "hydrocarbon" insert -- from metallic surfaces --.

Signed and sealed this 8th day of October 1957.

(SEAL)
Attest:
KARL H. AXLINE

Attesting Officer

ROBERT C. WATSON
Commissioner of Patents